United States Patent [19]

Denis

[11] 4,249,413
[45] Feb. 10, 1981

[54] METHOD AND DEVICE FOR LOCATING A DEFECTIVE TUBE IN A STEAM GENERATOR TUBE BUNDLE

[75] Inventor: Jean Denis, Mesnil-le-Roi, France

[73] Assignee: Electricite De France (Service National), Paris, France

[21] Appl. No.: 962,474

[22] Filed: Nov. 20, 1978

[30] Foreign Application Priority Data

Nov. 22, 1977 [FR] France ............................ 77 35037

[51] Int. Cl.² ...................... F28D 7/06; G01N 21/32; G01M 3/18
[52] U.S. Cl. .............................. 73/49.1; 165/11 R; 358/106
[58] Field of Search .......................... 73/49.1, 40.5 R; 165/11; 358/106

[56] References Cited

U.S. PATENT DOCUMENTS

| | | | |
|---|---|---|---|
| 2,909,975 | 10/1959 | Ulrich | 73/40.5 R X |
| 3,902,811 | 9/1975 | Altman et al. | 358/106 |
| 3,975,943 | 8/1976 | Brachet | 73/40.5 R |
| 4,022,270 | 5/1977 | Stockman | 165/11 |
| 4,025,201 | 5/1977 | Deane | 358/106 X |

*Primary Examiner*—Daniel M. Yasich
*Attorney, Agent, or Firm*—Sidney W. Millard

[57] ABSTRACT

In order to locate a defective tube in a U-tube bundle of a steam generator so arranged that the tube ends are fixed in a tube plate which defines an internal space with the bottom end-wall of the steam generator shell, the entire tube plate is swept by at least one camera placed within the internal space and is visualized on a display screen placed externally of the steam generator. A luminous mark having an identification function is projected independently onto the tube plate at the point corresponding to the extremity of a defective tube and is displayed on the screen during the sweeping operation.

9 Claims, 4 Drawing Figures

METHOD AND DEVICE FOR LOCATING A DEFECTIVE TUBE IN A STEAM GENERATOR TUBE BUNDLE

This invention relates to a method and a device for locating a defective tube in the bundle of tubes of a steam generator, especially of the inverted-U type in which the tube ends are joined to a tube plate. Between the tube plate and the bottom end-wall of the steam generator shell, there is formed an internal space which is divided into two adjacent headers respectively for the admission and discharge of a primary fluid. After passing through the tube plate, said primary fluid circulates within the tubes of the bundle whilst a secondary fluid to be vaporized circulates within the generator shell in contact with the external walls of said tubes and exchanges heat with the primary fluid through the tube walls.

It is known that, in a generator of this type which can have a very large number of tubes (for example over 3,000), a major difficulty lies in the need for accurate location of a defective tube within the bundle, especially when leakage occurs in the tube between the primary fluid and secondary fluid regions: this can give rise to serious incidents, especially if these two fluids react with each other. In design solutions known at the present time, this tube-locating operation is carried out by preliminary draining of the primary circuit, then by putting the secondary circuit under pressure while detecting the flow produced within one of the headers through one of the ends of the faulty tube or tubes. The final step consists in locating the other end of the same tube within the second header before sealing-off both ends of the tube.

In the majority of instances, however, the flow produced is of small value and usually takes the form of one drop at intervals of two or three seconds, with the result that an inspection of all the tubes takes a particularly long time. Moreover and especially if the steam generator is associated with a nuclear reactor and utilizes as primary fluid either the reactor core cooling agent or an intermediate fluid (water or sodium, for example), the headers are necessarily highly contaminated. As a consequence, entry into the interior of the headers by personnel becomes a hazardous operation and is in any case limited in time according to the permissible radiation dose rate. Finally, on account of the small size of headers and the need for a short time of entry in an irradiated and contaminated zone, inspection can only be carried out rapidly and therefore under conditions which are not conducive to strictly accurate fault location.

The present invention relates to a method for locating a defective tube which overcomes the disadvantages attached to solutions of the prior art, especially by avoiding the need for direct visual inspection by an observer within the primary headers of the generator.

To this end, the method under consideration essentially consists in transmitting an image of the tube plate within each header by means of an orientable television camera to a visual display system located outside the generator, then in superimposing on said image a luminous mark which performs an identification function for locating the extremity of the defective tube, said luminous mark being obtained by means of a projector which is also orientable and controlled independently of the camera.

The invention is also concerned with a device for the practical application of said method. The device essentially comprises within each header a box unit which carries two supports respectively for a television camera and a projector each having a parallel sighting axis on which the corresponding support is rotatably mounted, two mirrors associated respectively with the camera and with the projector and rotatably mounted on the corresponding support for rotation about an axis at right angles to the axis of rotation of the camera and the projector, means for carrying out independently on the supports the movements of the camera and of the projector and of their associated mirrors in order to permit sweeping of the entire tube-plate surface, means for illuminating said tube plate, means whereby the image of the tube plate and of the luminous identification mark formed by the projector is transmitted from the camera to the visual display unit outside the generator and to a control desk provided with a synoptic diagram of the tube plate, and elements for remotely controlling the means which carry out the movements of the camera and the projector.

Further distinctive features of a device for locating a tube within the tube bundle of a steam generator and also of the method carried into effect by means of this device will become apparent from the following description of one exemplified embodiment which is given by way of indication without any limitation being implied, reference being made to the accompanying drawings, wherein.

Figure 1:
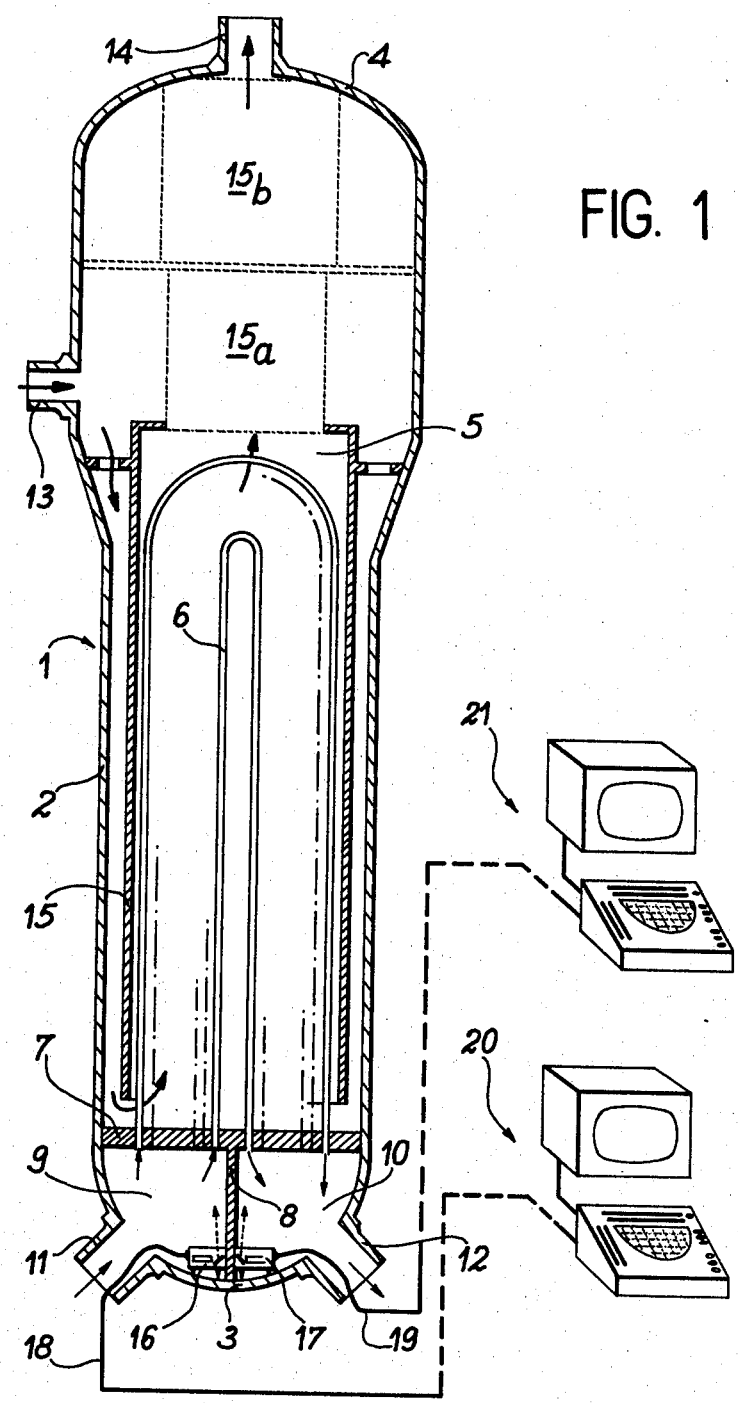
FIG. 1 is a diagrammatic axial sectional view of a steam generator comprising headers for the admission and discharge of primary fluid, provision being made in accordance with the invention for tube-locating box units mounted within the interior of the headers and connected to the exterior of these latter by means of visual display units.

The steam generator which is shown diagrammatically in FIG. 1 is generally designated by the reference 1 and mainly comprises a cylindrical shell 2 having a vertical axis, said shell being closed at the lower end by a hemispherical end-wall 3 and at the upper end by another end-wall 4 having substantially the same profile. Within the interior of the shell 2, the generator comprises a bundle 5 of circulation tubes 6, provision being made for 3,400 tubes in the example under consideration. Each tube has the shape of a hairpin or inverted U. The lower ends of said tubes are connected to a horizontal bottom plate 7 of suitable thickness or so-called tube plate through which the tubes are permitted to open into the region located between said tube plate and the bottom end-wall 3 of the steam generator. This region is divided by a vertical transverse plate 8 into two headers 9 and 10 respectively which are advantageously provided with an internal stainless steel cladding. The header 9 is supplied through an inlet nozzle 11 with a primary fluid usually consisting of water derived from the primary circuit of a nuclear reactor. After circulating within the interior of the tubes 6 of the bundle 5, said primary fluid collects within the second header 10 before being discharged from the steam generator through an outlet nozzle 12. By reason of the shape of the bottom end-wall 3, the headers 9 and 10 provide an internal space in the form of a quarter-sphere having a radius of 1,500 mm in the example under consideration; each header is associated with an opening for the admission or discharge of primary fluid, thus making it difficult for an operator to gain direct access, even in spite of ambient conditions of contamination and radioactivity. As it flows through the tubes 6 of the bundle 5, the primary fluid exchanges heat with a secondary fluid which is admitted into the steam generator in the liquid state through a transverse nozzle 13 which opens into the interior of the shell 2. Said secondary fluid is discharged in the form of steam through an outlet nozzle 14 which is provided at the top of the upper end-wall 4 and located in the axis of this latter. During its downward flow, the secondary fluid is first guided by a cylindrical skirt 15 which is coaxial with the cylindrical shell 2. After passing beneath the open lower end of the cylindrical skirt, said secondary fluid flows upwards in contact with the tubes 6 in order to undergo conversion from the liquid state to the state of steam. Drops of liquid which have been entrained are removed from the steam by passing through separators shown diagrammatically at 15a and 15b and mounted at the upper end of the cylindrical shell 2.

The invention accordingly consists in detecting any fault condition which may have occurred in any one of the tubes 6 of the bundle 5, especially by locating a leak which has developed within one of said tubes. In accordance with the known procedure, leakage is indicated by pressurizing the space outside said tubes and by the appearance of a droplet at the extremity of the tube concerned. In the example under consideration, the tubes of the entire array are distributed within each header in 94 rows and 46 columns with a pitch of 32.54 mm, the external diameter of each tube being 22.22 mm and the wall thickness of each tube being 1.27 mm. It is readily apparent from these values that the location of any single leaky tube calls for outstanding accuracy and reliability of detection which are precisely obtained by means of the arrangements in accordance with the invention.

Provision is accordingly made within each header 9 and 10 for two box units 16 and 17 of identical design, the dimensions of which are chosen with a view to permitting entry by operating personnel under exceptional or emergency conditions. These box units permit accurate location of the extremity of a leaky tube and are connected externally of the steam generator by means of connecting cables 18 and 19 to two control and visual display units 20 and 21 respectively. Said box units are in turn provided with means for projecting a luminous mark onto the defective tube and transmitting the image of this latter to the associated visual display unit; the tube which has thus been identified can subsequently be either repaired or sealed-off.

Figure 2:
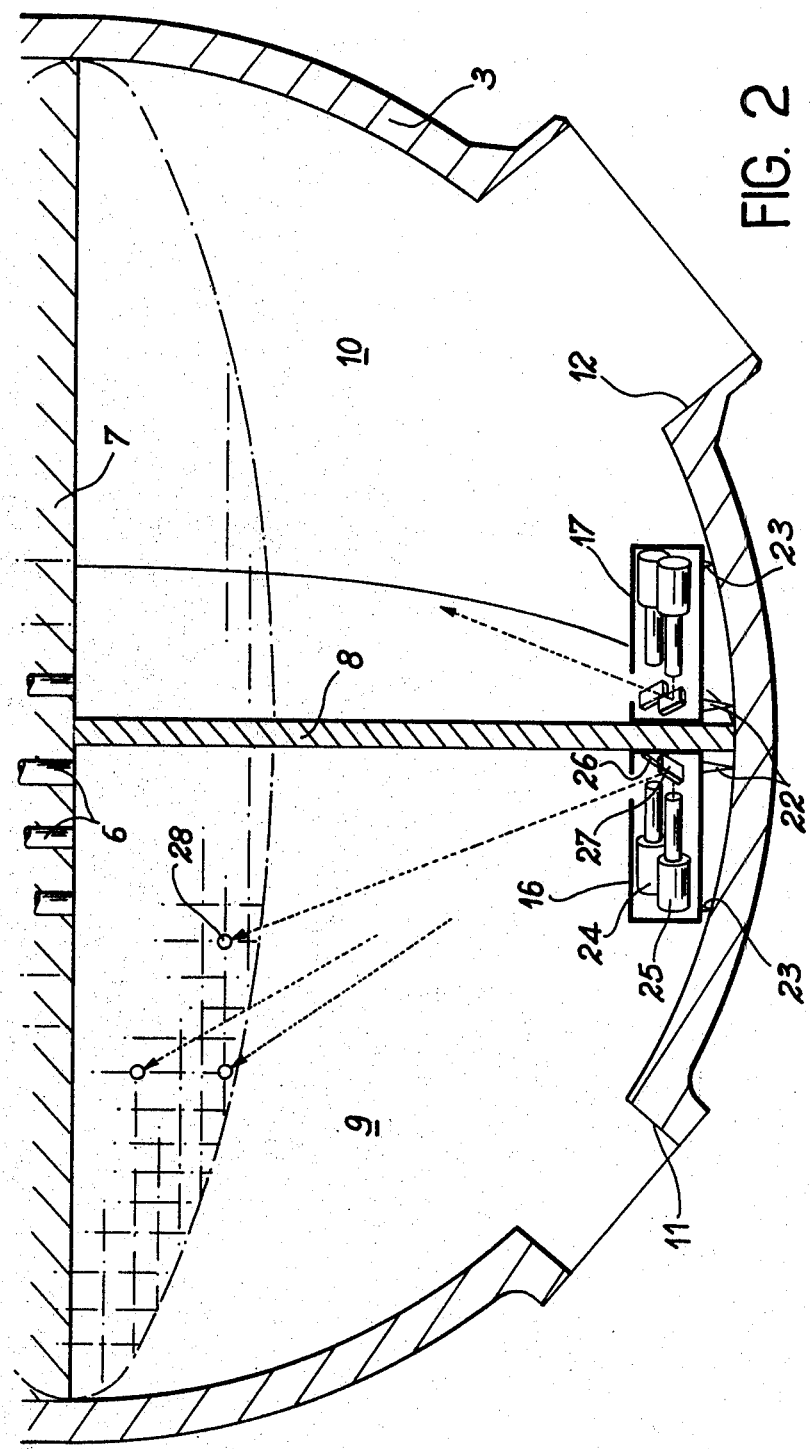
FIG. 2 is a transverse sectional view to a larger scale showing the headers of the generator in accordance with FIG. 1.

FIG. 2 illustrates in greater detail the assembly of the box units 16 and 17 within the headers 9 and 10. These box units are applied against the bottom end-wall of the corresponding header by means of feet 22 and 23 which are adjustable for height. Each unit mainly contains a projector 24 and a television camera 25 which cooperate respectively with two orientable mirrors 26 and 27, firstly in order to project onto the tube plate 7 and in particular onto any one extremity 28 of a defective tube 6, a suitable indicating mark such as a luminous cross having very thin, small arms in order to ensure that it does not extend over a number of tubes at the same time, then in order to retransmit to the visual display screen the image of the tube which has thus been located. As already mentioned, the two box units are of identical design in order to permit continuous location, within the opposite header, of the corresponding extremity of the tube detected by the other box unit, both units being also mounted symmetrically with respect to the vertical partition-wall 8.

Figure 3:
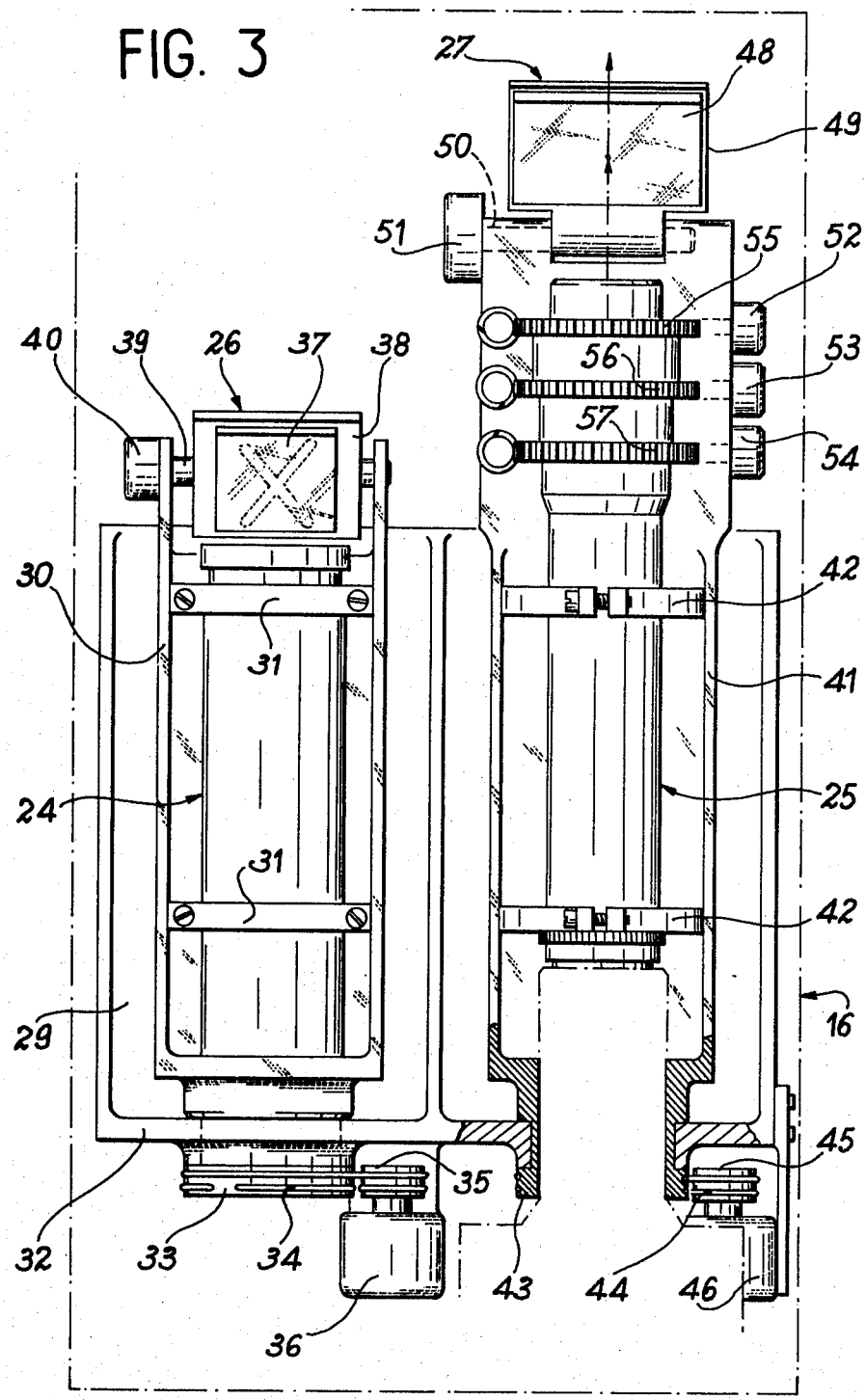
FIG. 3 is a top view of one of the tube-locating box units.

In FIG. 3, there is shown in greater detail and to a larger scale a top view of one of the leak-tight box units referred-to above, for example the unit which is designated by the reference 16. Within this box unit, the projector 24 is mounted on a support 29 within a cradle 30 and maintained within this latter by means of fastening collars 31. The cradle 30 has a rearward extension through the end-wall 32 of the support 29 and is fitted with a driving pulley 33. A transmission cable 34 is wound around said pulley 33 within the groove of this latter and is adapted to cooperate with a driving pulley 35 which is mounted on the output shaft of a motor 36. The rotation of said motor 36 thus serves to rotate the pulley 33 and consequently to displace the projector 24 in pivotal motion about its own axis, the light ray provided by the projector being received by the pivoting mirror 26. This mirror has a reflecting surface 37 carried by a flat frame 38 which is in turn rigidly fixed to a transverse shaft 39 located at right angles to the axis of the projector 24 and mounted between the ends of the pivoting cradle 30, said shaft 39 being in turn driven in rotation about its own axis by a motor 40. By means of the motors 36 and 40, the movements of rotation of the projector 24 about its own axis are thus combined with the movements of rotation of the mirror 26 about an axis at right angles to the preceding, with the result that the luminous mark provided by the projector can be reflected onto any one extremity 28 of a defective tube of the bundle 6.

The support 29 also carries the television camera 25 which serves to return to the exterior of the steam generator the image of the luminous cross which is provided by the projector 24. To this end, said camera 25 is in turn mounted in a pivoting cradle 41 and held in position within this latter by means of fastening collars 42. The rear portion of said cradle 41 extends through the end-wall 32 of the support 29 and is fitted with a pulley 43 in cooperating relation with a transmission cable 44 and this latter is driven by a pinion 45 which is in turn driven by a motor 46. In the same manner as before, the motor drives the cradle 41 in pivotal motion and consequently drives the camera 25 which is associated with the mirror 27. The reflecting surface 48 of said mirror is mounted on a flat frame 49 which is displaced in pivotal motion about a shaft 50 by means of a second motor 51, said shaft 50 being at right angles to the sighting axis of the camera. Three other motors 52, 53 and 54 engage with toothed rings 55, 56 and 57 respectively which are carried by the camera 25. By means of a suitable remote control, said motors serve to adjust the focusing, the lens aperture and focal length.

As in the case of the projector, the combination of the movements produced by the motors 46 and 51 makes it possible to frame the image filmed by the camera with any region of the tube plate 7 and especially to locate the exact position of the luminous cross formed by the projector 24 on the extremity 28 of a defective tube.

Scanning control systems of this type are known, such as, for example, in U.S. Pat. No. 3,902,811.

Figure 4:
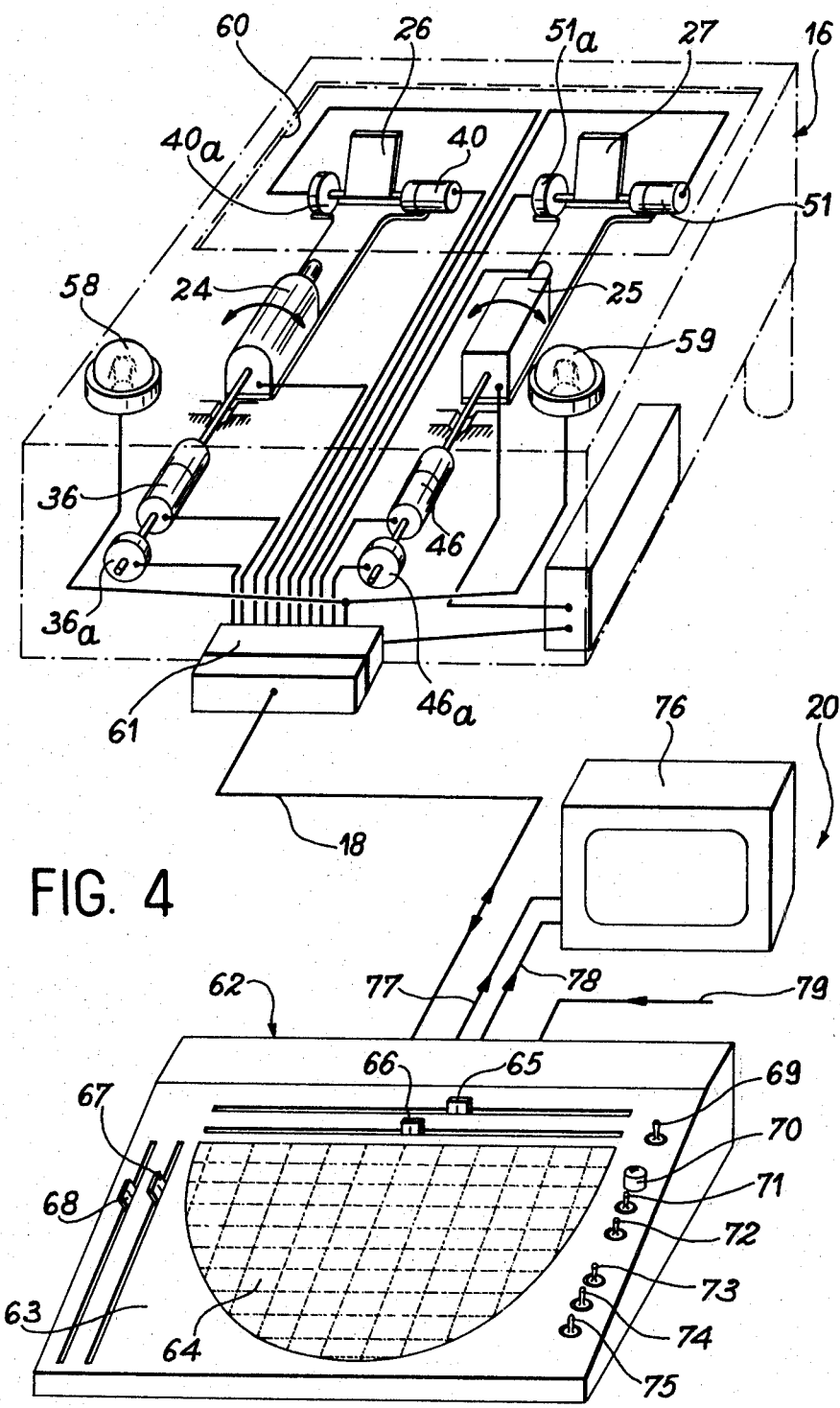
FIG. 4 is a view in perspective which shows the tube-locating box unit of FIG. 3, the method adopted for connecting said box unit to the external visual display unit, and remote control means.

The perspective view of FIG. 4 again shows the leak-tight box unit 16 containing the projector 24 and the camera 25 and provides in particular a detailed illustration of the electrical connections established between the different associated control elements. In this figure are also shown two lamps 58 and 59, especially of the quartz-iodine type having a power of 1000 W and carried by the box unit. The intended function of these lamps is to illuminate the header in order to provide the necessary lighting for the shots taken by the television camera 25. The motors 40 and 51 which control the pivotal displacement of the mirrors 26 and 27 are associated respectively with two recopy potentiometers 40a and 51a whilst the motors 36 and 46 which serve to rotate the supporting cradles are associated respectively with potentiometers 36a and 46a. The top face of the box unit 16 is provided with a wide opening 60 through which the light rays reflected from the mirrors 26 and 27 can be directed onto the tube plate 7. Finally, the electrical connections from the different motors and potentiometers are grouped together within a junction box 61. A single lead-out cable 18 which passes out of the junction box connects the box unit 16 to the external visual display unit 20 and to a remote control unit 62 which is associated with this latter. Said remote control unit mainly comprises a control desk 63 on which is represented a synoptic diagram 64 of the tube half-plate 7 of the corresponding header 9 or 10. Two pairs of control knobs designated respectively by the references 65, 66 and 67, 68 serve to actuate the corresponding motors and to control the lateral positions, namely the movements of rotation of the projector 24 and of the camera 25 in the case of the knobs 65, 66 and the vertical positions of the mirrors 26 and 27 in the case of the knobs 67, 68. This accordingly permits accurate position-setting of the projected luminous cross in accordance with the position of each tube under inspection. The control desk 63 also comprises a general switch 69, an ambient-lighting intensity control 70 for producing action on the lamps 58 and 59, a switch 71 for turning-on the projector 24 and finally three knobs 73, 74 and 75 connected to the motors 52, 53 and 54 for the camera adjustments. The indications supplied by the control desk 63 are directed at the same time to a television receiver 76 at the visual display station by means of two output cables 78 and 77. Finally, the connection 79 shown in the figure represents the general circuit supply.

There is thus provided a device for locating the extremity of any defective tube among all the tubes of a steam generator. By coupling two box units and two visual display screens in parallel, the two symmetrically arranged ends of the tube considered can accordingly be located simultaneously. Within each box unit, the projector and camera supports are capable of oscillating about horizontal axes through an angle of plus or minus 50° from the vertical, each mirror being also capable of pivoting about perpendicular axes through an angle of 50° from the vertical plane. By virtue of these arrangements, the sighting axis of each camera can thus travel over the entire surface of the tube plate which delimits the top wall of the header. The effective positions of the supports and mirrors which are determined by the controls of the external desk require only a simple correction by the recopy signal in order to retain a linear representation of the tube plate on said control desk.

The lens opening, focal length and adjustment of the cameras can be controlled from the corresponding desk by means of the switches 73, 74 and 75. These switches advantageously consist of reversing keys providing automatic return to the rest position, variable resistors (not shown) for adjusting their speed of operation if necessary.

It will be readily apparent that the present invention is not limited solely to the example of construction which has been more especially described with reference to the accompanying drawings but extends on the contrary to all alternative forms. In particular, the device in accordance with the invention and the method of application of this latter are not limited to the single field of primary fluid headers of nuclear reactor steam-generating units. The invention could also be utilized to advantage in other areas of application such as, for example, remote inspection of the internal lining of a pressure vessel lid or the like.

We claim:

1. In a method for identifying a defective tube which has been located in a steam generator, said steam generator including a shell, a plurality of heat exchanging tubes disposed within said shell and provided with extremities, a tube plate disposed within said shell in which said extremities are fixed, and a bottom end wall which with said tube plate defines an internal space, the improvement for identifying said defective tube which comprises:

sweeping the entire tube plate by means of at least one camera placed within said internal space in order to visualize said entire tube plate on a screen which is external to said steam generator, and independently projecting a luminous mark onto said tube plate at a point for its identification, said point corresponding to said extremity of said defective tube, said projecting being in a manner such that said luminous mark appears on said screen during said sweeping with said camera.

2. In a method for identifying a defective tube which has been located in a steam generator, said generator including a shell, a plate tube disposed within said shell, and a bottom end wall, said tube plate and said bottom end wall defining an internal space, a partition separating said internal space into two half internal spaces and separating said tube plate into two tube plate portions, a bundle of U-shaped tubes disposed within said shell, each tube having two extremities, said extremities being fixed in said tube plate, one extremity of each tube opening into one of said half internal spaces and the other extremity of each tube opening into the other half internal space, the two extremities of each tube being disposed symmetrically with respect to said partition plate, the improvement for identifying said defective which comprises:

sweeping the two tube plate portions by means of a specific camera for each of said portions in order to visualize the entire tube plate on a display screen which is external to said generator, projecting independently a first luminous mark onto one of said two tube plate portions at a point for its identification, said point corresponding to a first extremity of a defective tube fixed in one of said two tube plate portions, and projecting a second luminous mark onto the tube extremity which occupies a symmetrical position with respect to said first extremity of said defective tube, both of said luminous marks being displayed on said screen during said sweeping of said two tube plate portions.

3. A device for identifying a defective tube which has been located in a steam generator, said generator comprising a shell having a bottom end wall, a plurality of U-tubes disposed within said shell, each of said tubes having two extremities, a tube plate disposed within said shell which defines with said end wall an internal space which is divided by a partition wall into an inlet header and an outlet header, said tube plate also being divided by said partition wall into an inlet half tube plate and an outlet half tube plate, one extremity of each tube being fixed within said inlet half tube plate and the other extremity being fixed within said outlet half tube plate, said device comprising:

a. a first and a second box unit housed respectively within said inlet header and within said outlet header, each box unit comprising:

a television camera;

a projector adapted to project an individual identification image beam, said camera and said projector each having a proper sighting axis;

first and second mirror means for deflecting respectively the beam received by said camera and the beam emitted by said projector;

first motor means for displacing the first mirror means so that said individual identification image can reach any extremity of one tube of one of the two half tube plates, and second motor means for displacing said second mirror means so that said beam received by said camera can come from any one of an extremity of a tube of one of the two half tube plates;

b. two control desks external to said steam generator, each desk being associated with one of said box units, each control desk comprising a synoptic diagram of the associated half tube plate, and means for displacing said mirror means, and c. two visual display units external to said generator and associated with each of said box units, each visual display unit being adapted to receive the information delivered by the corresponding camera.

4. A device according to claim 3, wherein each box unit further comprises a first cradle on which is fixed said television camera and a second cradle on which is fixed said projector, each said cradle being mounted for pivotal motion about said sighting axis of the respective camera and projector with respect to said box unit, a motor for driving each said cradle in pivotal motion, said first and second mirror means each being a plane mirror mounted for rotational motion about an axis at right angles to the sighting axis of said camera and said projector and carried by an extension of said cradle.

5. A device according to claim 4, each motor and each motor means is associated with recopy potentiometers for remotely controlling said motors in dependence on a reference position defined on the synoptic diagram of the control desk.

6. A device according to claim 3, wherein means for illuminating each half tube plate comprises lamps and especially quartz-iodine lamps carried by each box unit.

7. A device according to claim 3, wherein each box unit is provided with feet which are adjustable for height and which bear on the bottom end-wall of the steam generator within each header, said feet being adjusted in order to ensure a parallel relation between each cradle and the tube plate.

8. A device according to claim 3, wherein each camera comprises focusing means, a diaphragm, and means for adjusting its focal distance each associated with a motor which is remote-controlled from the control desk in order to adjust the focusing, the diaphragm and the focal distance.

9. A device according to claim 8, wherein the motors associated with said focusing means, said diaphragm, and said focal distance adjusting means are controlled from the control desk by means of reversing keys providing automatic return to the rest position, provision being made for variable resistors which serve to adjust the rate of travel of said keys.

* * * * *